Jan. 11, 1938.  J. T. WHALEN  2,104,939
REFRIGERATOR SHELF
Filed June 11, 1934  5 Sheets-Sheet 2
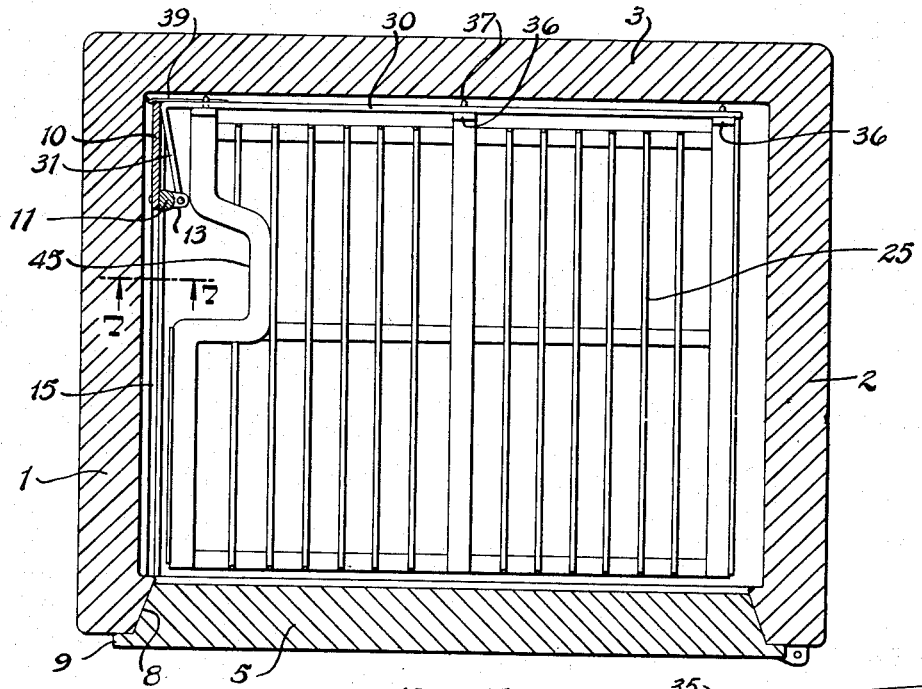
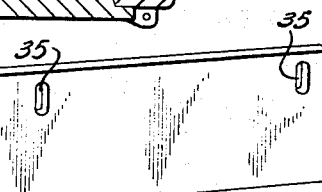
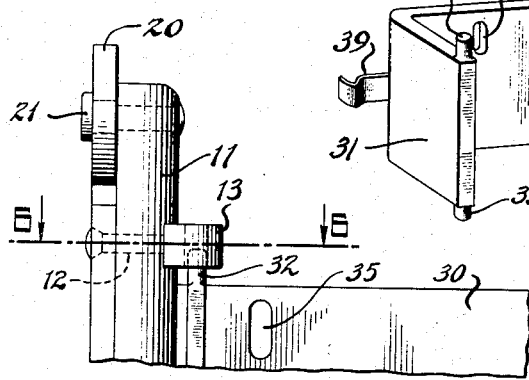
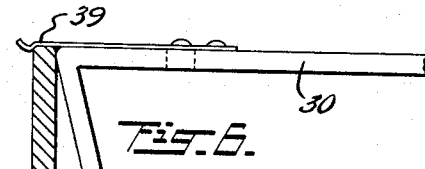
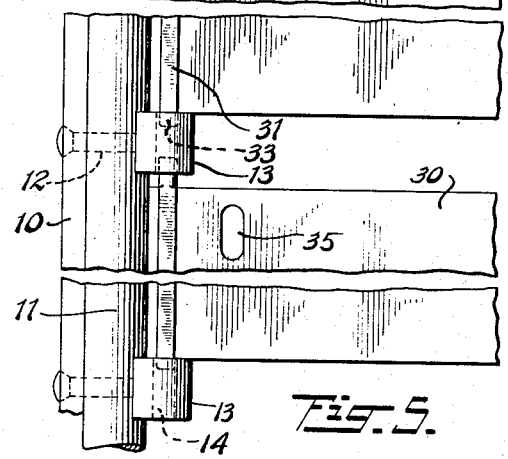
INVENTOR
J. T. Whalen
BY
Morgan, Finnegan & Durham
ATTORNEYS

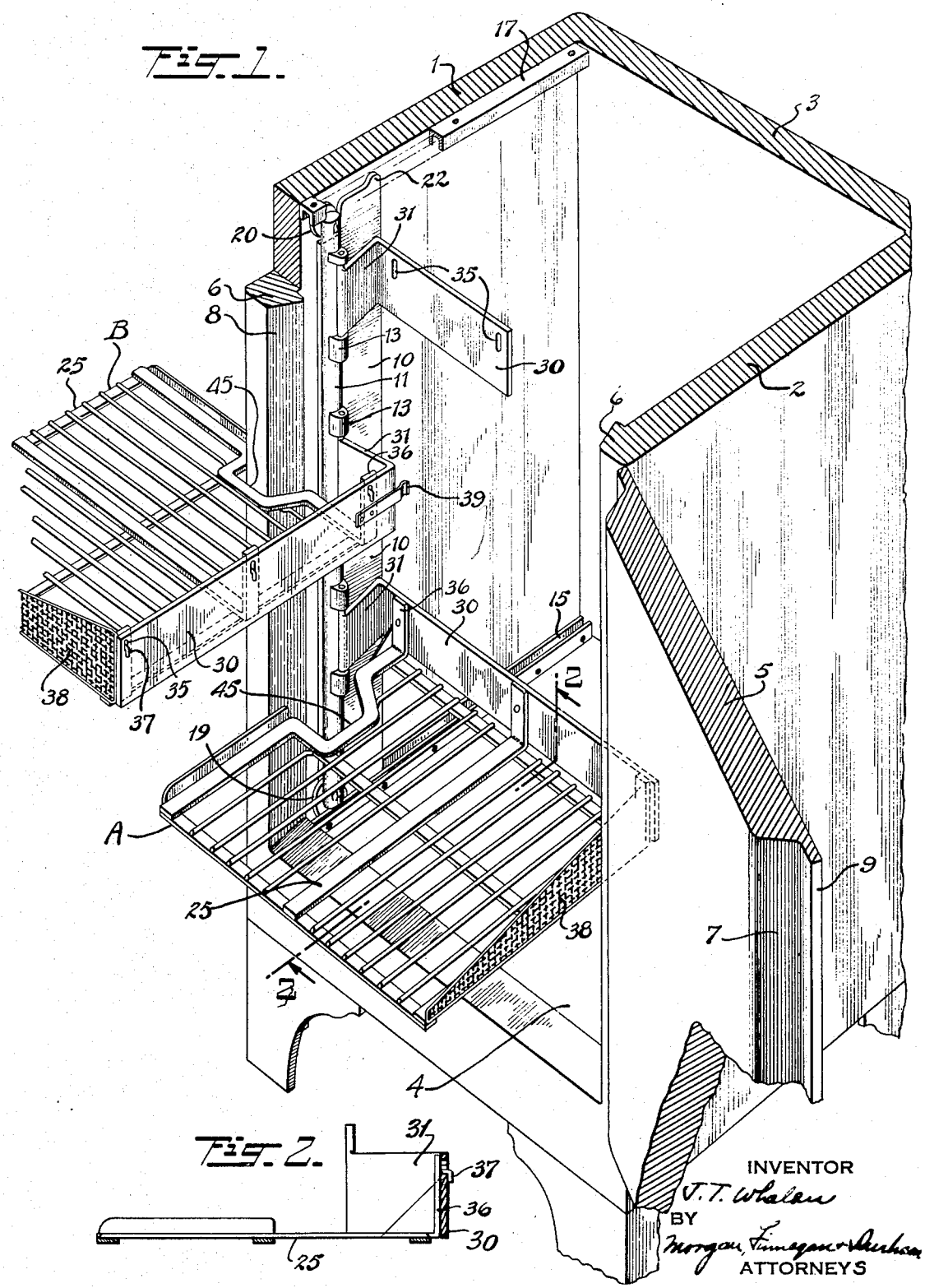

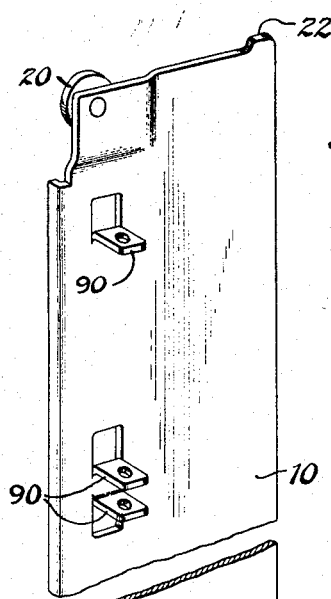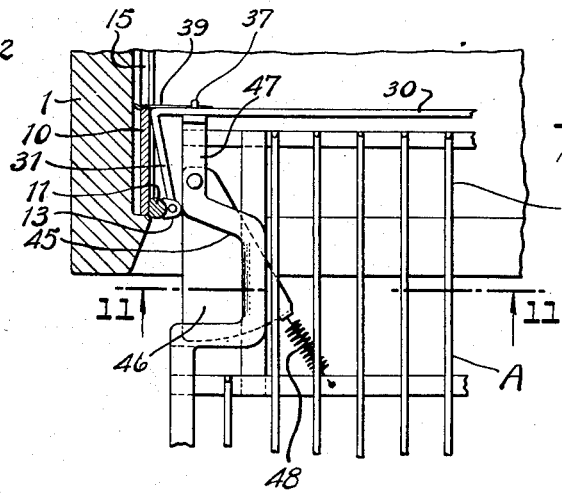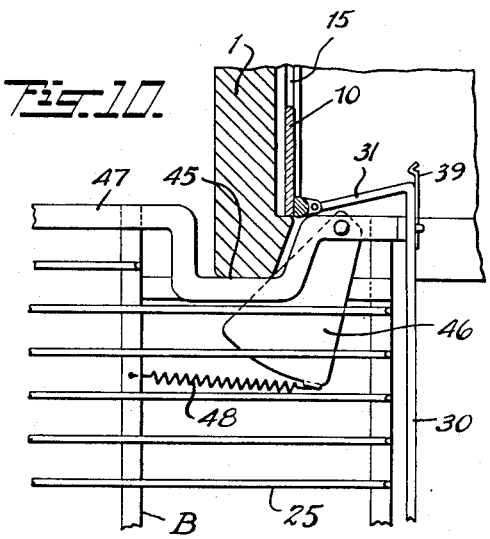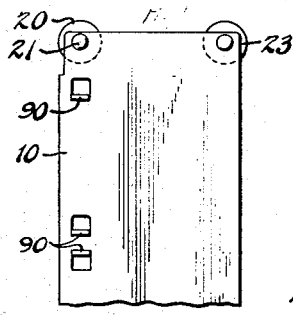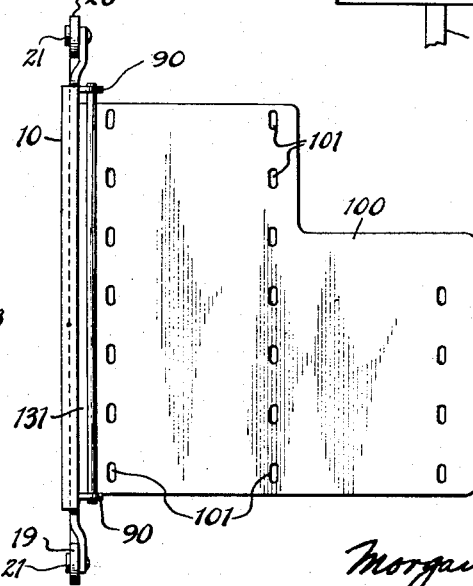

Jan. 11, 1938. J. T. WHALEN 2,104,939
REFRIGERATOR SHELF
Filed June 11, 1934 5 Sheets-Sheet 4
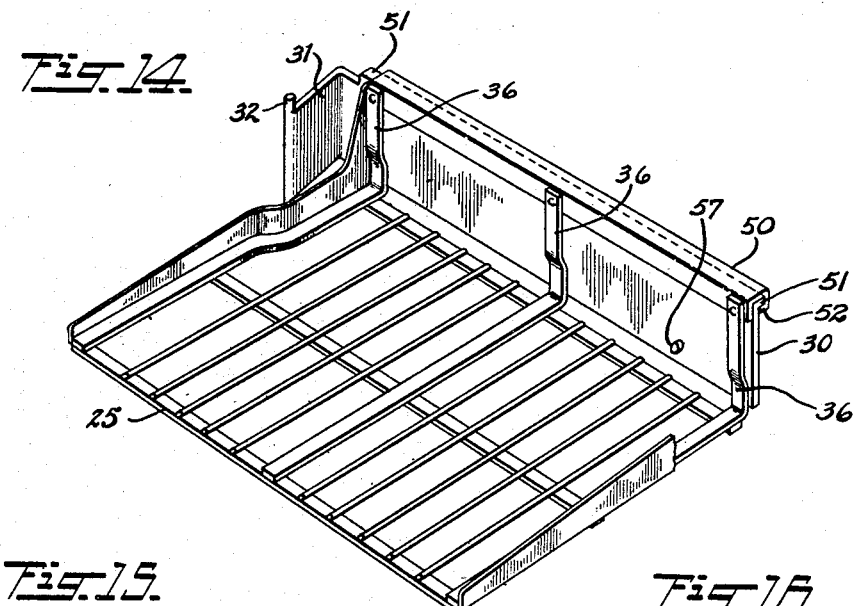
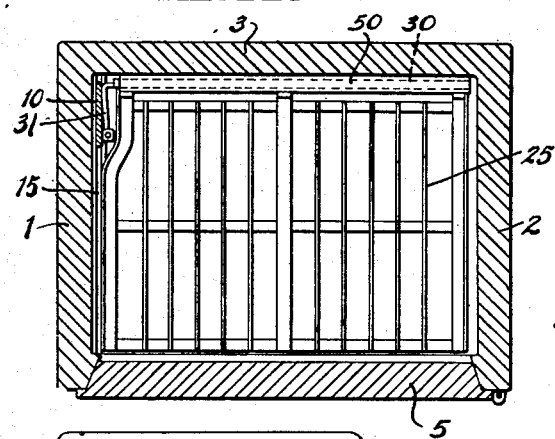
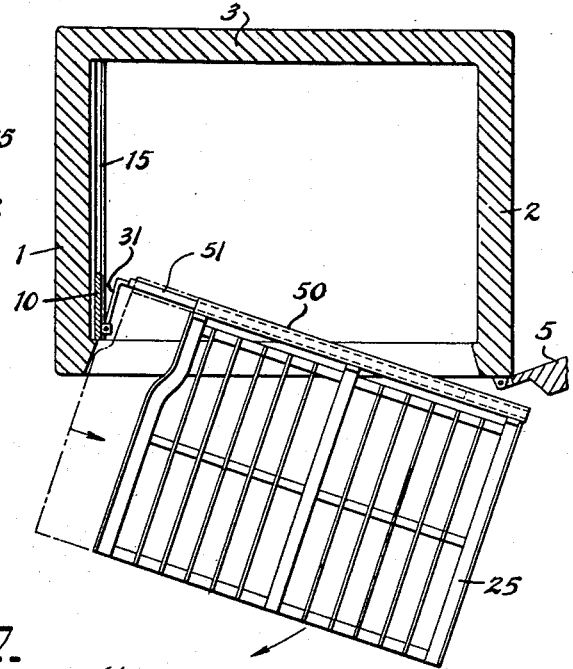
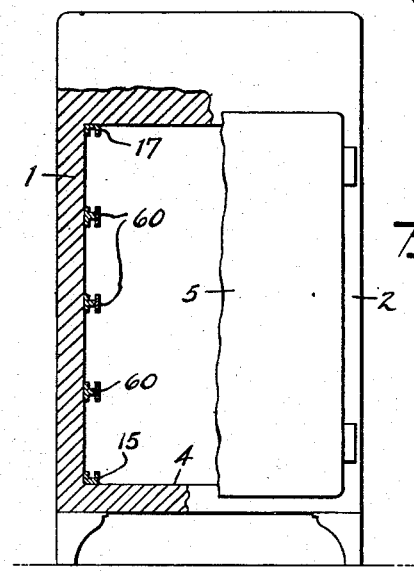
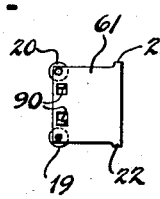
INVENTOR
J. T. Whalen
BY
Morgan, Finnegan & Durham
ATTORNEYS

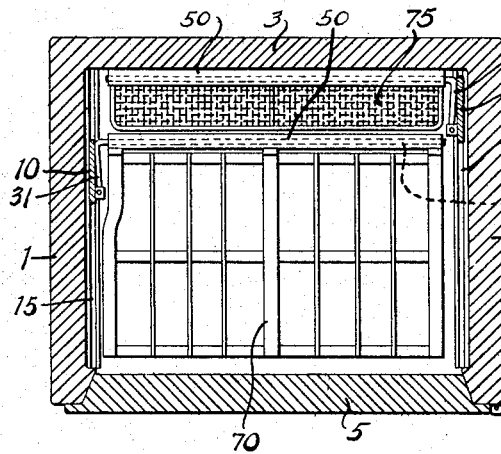
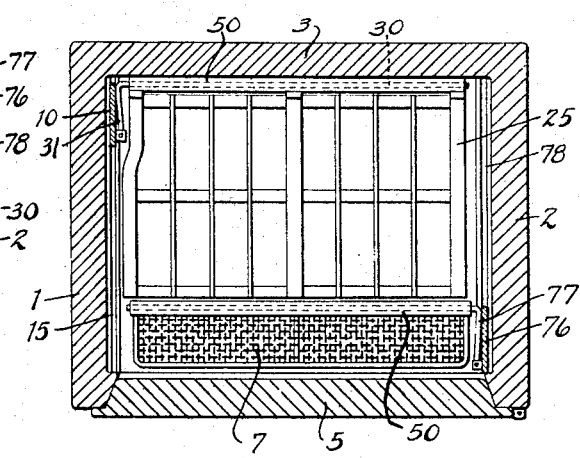
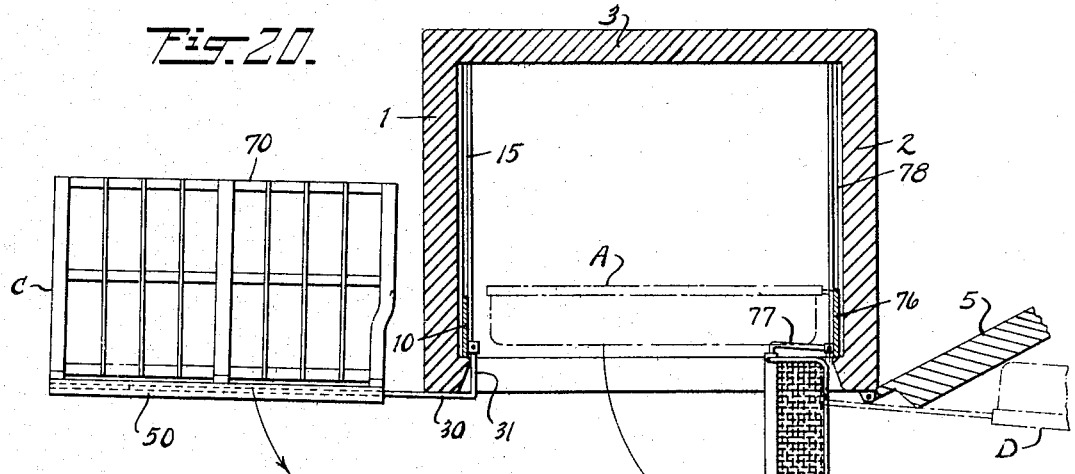
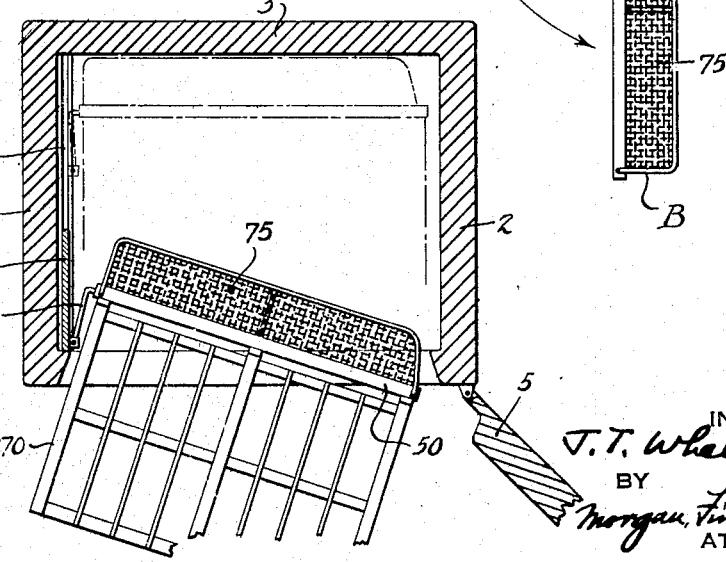

Patented Jan. 11, 1938

2,104,939

UNITED STATES PATENT OFFICE 2,104,939

REFRIGERATOR SHELF

John T. Whalen, New York, N. Y.

Application June 11, 1934, Serial No. 729,960

14 Claims. (Cl. 312—181)

The invention relates to new and useful means for arranging and mounting shelves or similar article supports in containers or cabinets such as refrigerators.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a fragmentary, perspective view of a refrigerator cabinet embodying the invention;

Fig. 2 is a detail section on line 2—2 of Fig. 1;

Fig. 3 is a horizontal section of a refrigerator such as shown in Fig. 1 with the door and shelves in closed position;

Fig. 4 is a detail elevation of a shelf-supporting arm;

Fig. 5 is an enlarged elevation, with parts broken away, of a travelling carrier with shelf-supporting arms attached thereto;

Fig. 6 is a horizontal section on line 6—6 of Fig. 5;

Fig. 7 is a vertical section on line 7—7 of Fig. 3;

Fig. 8 is a detail perspective of a modified form of travelling carrier;

Fig. 9 is a fragmentary plan of a modified form of shelf mounting;

Fig. 10 is a view similar to Fig. 9, showing the shelf in open position;

Fig. 11 is a vertical section on line 11—11 of Fig. 9;

Fig. 12 is a fragmentary elevation showing another modified form of carrier;

Fig. 13 is a vertical elevation of a modified form of carrier and shelf-supporting plate;

Fig. 14 is a perspective view of the preferred form of shelf-supporting arm and shelf assembly;

Fig. 15 is a horizontal section of a refrigerator showing the mechanism of Fig. 14 in closed position;

Fig. 16 is a view similar to Fig. 15, showing the shelf and arm in an intermediate position;

Fig. 17 is a view of a refrigerator, partly in elevation and partly in section, showing a modified arrangement of tracks;

Fig. 18 is a detail of the modification shown in Fig. 17;

Fig. 19 is a horizontal section showing a double arrangement of shelves and/or containers;

Fig. 20 is a view similar to Fig. 19 showing a shelf and container in open position;

Fig. 21 is a view similar to Fig. 19 showing the shelf and container in reversed positions; and Fig. 22 is a similar view showing a modified form of shelf and container.

The invention is directed to providing novel and useful arrangements of shelves or equivalent supports for articles, whereby the shelves may be moved to various positions with respect to a cabinet or other shelf-containing structure to enhance the convenience in the use of the shelves and access to the cabinet. The invention is especially useful for and adapted to domestic refrigerator constructions and certain features thereof are substantially peculiar to shelf mountings and arrangements for refrigerator cabinets. It will be clear, however, that certain aspects of the invention are applicable to other constructions, such as wardrobes, book cases, and the like. The use hereinafter of such terms as shelf, refrigerator cabinet, etc., will therefore be understood to apply broadly to equivalent constructions and are not limited to the narrower meanings of such terms, although the preferred embodiment of the invention particularly described and shown relates especially to refrigerator constructions.

An object of the invention is to give more ready and convenient access to the interior of a refrigerator cabinet or the like to permit cleaning and airing thereof, while rendering it unnecessary to disturb or remove the food or other articles on the refrigerator shelves. In present refrigerator constructions, it is usually necessary to take all the bottles, food packages, etc., off the shelves and out of the cabinet or food chamber for cleaning purposes and these articles must all be rehandled after the cleaning and airing are completed. The invention provides means whereby the entire contents of the food chamber, including the shelves, trays and all their contents, may be pulled out of the food chamber and swung entirely clear thereof and of the door opening, so that the food chamber can be easily reached and cleaned. The constructions of the invention are relatively simple and sturdy and easy to operate and leave the interior of the food chamber substantially free from pins, brackets, holes or other surface irregularities which would tend to retain dirt and bacteria.

The invention further provides a construction whereby the various shelves or trays in the refrigerator cabinet may be selectively and independently removed with respect to each other, thereby permitting access to any selected part of the interior of the cabinet without interference with the other parts. The invention further provides for varying the vertical positions and spacing between food shelves within the refrigerator cabinet and this also may be done without disturbing the articles on any of the shelves and without requiring handling thereof.

The invention permits a great flexibility in the arrangement of the shelves and receptacles both within and without the food chamber. By certain features of the invention the shelves in different parts of the chamber may be caused to change places with each other and various flexible re-arrangements of the shelves may be made without disturbing the contents. Furthermore, for removing the shelves from the interior of the food chamber, the invention provides a very considerable range of positions so that the withdrawn shelves may be temporarily disposed in the most convenient external positions, depending upon the position of the refrigerator with respect to other objects. For example, in some refrigerator locations it may be desirable to move the shelves entirely around the end of a side wall of the refrigerator so that they will lie behind the plane of the door, while in other locations the shelf may be positioned more conveniently in front of the door opening or at the other side, and a feature of the invention is to provide great flexibility in shelf arrangements and disposition.

In its present preferred embodiment, the invention comprises a vertically disposed carrier or frame which is movable along one of the side walls from the rear to just within the front inner face of the refrigerator cabinet. The carrier supports a plurality of horizontally swingable arms or plates for supporting the shelves or food trays within the cabinet and for positioning the shelves outside the cabinet. These arms are independently pivotally mounted on the carrier and the shelves are removably attached to the arms. By virtue of this construction, it is possible to move the entire battery or rack of shelves forwardly and through the open door of the refrigerator, thereby giving ready and immediate access to all the articles. When in the forward position any or all of the various shelves may be swung around the end of the side wall and door frame, thereby giving access to the interior of the food chamber. The swinging movement of the shelves may be more or less than ninety degrees, as desired. Furthermore, the various shelves and/or arms may be variably positioned vertically with respect to the carrier to provide variable spacing between shelves. Numerous other flexible and variable features may be combined to provide numerous different arrangements of the shelves and their supporting means as hereinafter described in detail.

It will be understood that the foregoing general description and the following detailed description as well are exemplary and explanatory of the invention but are not restrictive thereof.

Referring now in detail to the present preferred embodiment of the invention, shown by way of example on the accompanying drawings, the invention is shown as applied to a refrigerator cabinet of any known modern type. The showing of the refrigerator cabinet is fragmentary and somewhat diagrammatic, it being understood that the detailed construction of the refrigerator or other cabinet or enclosure constitutes no necessary part of the invention and that the novel features of the invention may be applied to practically any form of refrigerator, ice chest or similar compartment. As embodied, the cabinet comprises side walls 1 and 2, rear wall 3 and bottom 4 of any suitable refrigerator-wall construction. Such walls, as indicated, are usually provided with suitable thicknesses of insulating material, which is diagrammatically indicated. The similarly constructed top of the refrigerator and the ice or refrigerating unit are not shown. The refrigerator door 5 is indicated as of the usual hinged type and of the same thick insulated construction as the walls. In accordance with the usual construction, the door is formed to fit substantially flush with the surface of the thick front wall 6 of the cabinet, usually being constructed with a bevelled closing edge 7 to cooperate with the similar edge 8 on the front wall and is provided with overlapping flanges 9 at the closing edges.

In accordance with the invention, a travelling shelf carrier 10 is mounted to travel along the inner surface of one of the side walls, said carrier being adapted to support pivotally mounted shelf supporting arms and through them, the refrigerator shelves. As embodied, the carrier comprises a relatively long and narrow metal web or plate 10 (Figs. 1, 5, and 6). The depth of the plate, i. e., the distance it extends from the rear to the front of the cabinet, is sufficient to adequately support the weight of the shelves and their contents and to permit travel of the carrier along its tracks as hereinafter described. A vertically-extending hinge rod 11 is fixed to the inner face of the carrier adjacent its leading or forward edge, as by pins 12 which are formed integrally with the hinge socket members 13.

In accordance with the invention, the carrier 10 is mounted to travel horizontally parallel with the inner face of the side wall 1 of the cabinet. As embodied, a trackway 16 is fixed to the inner surface of the side wall along the bottom (Fig. 7). A similar overhead trackway 17 is fixed to the inner surface of the refrigerator top along the top edge of the wall 1. The carrier is provided with rollers 19 and 20 at the bottom and top respectively of the hinge rod 11, said rollers being adapted to travel in the upper and lower trackways as will be clear from the drawings. The rollers are preferably rotatably mounted on pins 21 which project through the hinge rod (Fig. 5). The rear or trailing edge of the carrier 10 is preferably provided with vertically extending guide lugs 22 at the top and bottom, said lugs serving to prevent rocking of the carrier. If preferred, the trailing edge of the carrier plate may instead be provided with guide rollers 23, and such a form is shown in Fig. 12.

The carrier 10 is adapted to support and permit to-and-fro movement of the refrigerator shelves or food trays 25. As embodied, a plurality of shelf-supporting arms or plates 30 (Figs. 1 to 6) are pivotally connected to the hinge rod 11 of the carrier. Said plates are preferably formed of suitably strong narrow metal strips, commonly about two inches in width. The end of the plate adjacent the carrier is bent to form an arm 31 which extends at an angle greater than ninety degrees to the main body of the plate, as indicated in Fig. 6. Hinge lugs 32 and 33 project upwardly and downwardly respectively from the edges of the arm 31 at its end. As shown, the arm 30, 31 is hingedly connected to the hinge rod 11 by the socketed hinge brackets 13. Said brackets 13 are preferably bored at 14 to receive the lugs 32 and 33. To permit easy removal of the arm from the hinge, the length of the upper lug 32 is greater than that of the lower 33. When in position, (Fig. 5) the lower edge of the arm 31 bears on the upper surface of member 13, while there is an equivalent clearance between the upper edge of the arm and the bottom of the member 13. Thus, to remove one of the arms 30 from the hinge brackets 13, the arm may simply be raised until the lower lug 33 clears the hole or socket 14 in the member 13 and the upper lug then withdrawn by slightly twisting the arm. The arm may be re-hung in the hinge brackets by reversing this process.

Referring to the embodied means for attaching the shelves 25 to the swinging arms 30, it will be seen that the arms are provided with a plurality of slots 35. The shelves comprise essentially a flat rectangular grid 25 or other suitable like construction which will support the articles to be placed upon them while permitting the desired circulation of air. Along the rear edge of the shelves the frame members 36 are turned up to provide for attachment to the arms 30, suitable hooks 37 extending rearwardly and downwardly from the members 36 to engage in the slots 35. Thus the shelves may be readily attached to and detached from the swinging arms 30, while the depth of the arms and the members 36 provide a substantial cantilever support for the shelves. The shelves are preferably constructed with side guards such as the wire grids 38 for strengthening and to prevent articles from slipping off.

It will be clear from the foregoing that simple means are provided for varying the levels at which the shelves may rest and also the vertical spaces between the shelves. By simply detaching the hinge lugs 32 and 33 from one set of hinge brackets 13 and attaching them to another, the level of a shelf-supporting arm 30 may be varied at will and within as narrow a range as practical considerations would require. During the changing of the levels, the shelf and contents may be left connected to the shelf-supporting arm 30 or detached as desired.

The normal arrangement of the shelves within the food chamber of the refrigerator is indicated in Fig. 3. As shown, the arm 30 lies parallel and adjacent to the rear wall 3 of the chamber, the carrier 10 being in its rearmost position. It will be noted that the shelf occupies substantially the entire rectangular space within the food chamber, so that the complete amount of shelf room is assured. Means are provided for detachably holding the shelves in this normal position during their to-and-fro movement so that the battery of shelves will normally move together as a unit with the carrier. As embodied, flat spring catches 39 are fixed to the rear faces of each arm 30 and extend beyond the elbow to hook over the rear edge of the carrier 10 (Figs. 4 and 6). It will be clear, therefore, that when the refrigerator door is opened the entire battery of shelves may be drawn forward together to the forward limit of travel of the carrier 10. When in that position, the shelves will all extend out of the door opening in the position indicated by the shelf marked A in Fig. 1. It will further be noted that, in the forward position A, the leading edge and hinge rod 11 of the carrier 10 lie somewhat within the forward inner corner of the side wall 1 and thus considerably to the rear of the front outer face and corner of the refrigerator cabinet.

As contemplated by the invention, the various shelves are adapted to be moved, preferably independently, from the position A (Fig. 1) to different angular positions outside the refrigerator, thereby to give better access to the interior of the refrigerator and to the articles themselves on the various shelves. As embodied, the shelf arms 30 are adapted to swing, with their respective shelves, around the end of the side wall 1 and the portion 6 of the front wall into any desired angular position outside the refrigerator and away from the door opening.

In the form shown in Figs. 1 and 3, a shelf 25 may be swung approximately ninety degrees into the position B, or any intermediate position simply by releasing the spring catch 39 and pulling the shelf around on the arm pivots 32 and 33. In this form the shelf frame is provided with a re-entrant portion or gap 45 to bridge around the projecting corner of the refrigerator and thus permit the shelf to swing fully out of the door opening.

In the modified form of shelf shown in Figs. 9, 10, and 11, means are provided for permitting utilization of the re-entrant space 45 when the shelves are in their normal or closed position. As shown, a supporting leaf or blade 46 is pivotally mounted on the under side of the frame member 47 of the shelf and is normally held in the gap-closing position shown in Fig. 9 by a spring 48 attached to the shelf frame. When the shelf is swung to position B (Fig. 10), the leaf 46 will be forced away from the gap 45 by the corner of the refrigerator, as shown.

The invention preferably provides for more extensive swinging movement of the shelves and in the preferred form of shelf construction and mounting (Figs. 14 to 16), means are provided for swinging the shelf practically 180 degrees around the refrigerator corner. Accordingly, the shelf is constructed to have a corner-clearing movement along the supporting arm 30 and away from the pivot and corner about which it rotates. As shown in Figs. 14, 15, and 16, the rear frame members 36 of the shelf frame are slidably supported on the upper edge of the shelf arm 30 by a U-shaped guideway 50 which fits over the upper edge of the arm 30. The upper edge 51 of said arm is preferably L-shaped and thus locks over the re-entrant flange 52 on the guideway 50, thereby firmly securing the slidable parts together. A stop 57 cooperating with the center frame bar 36 normally prevents too great a sliding movement, although the shelf may be removed by a slight twisting around the stop.

The operation of the hereinbefore described slidable shelf mounting is indicated in Figs. 15, 16, and 20. In the normal or closed position, the shelf guideway 50 is telescoped with the shelf arm 30 and thus lies within the confines of the food chamber of the refrigerator. When the shelf has been pulled forward to position A, it then may be moved away from the pivot by swinging it slightly outwardly to clear the doorway and then sliding it along the arm 30 as indicated in Fig. 16. The shelf may thus be slid a sufficient distance away from the pivot so that it can be swung entirely clear of the corner of the cabinet and into the position marked C in Fig. 20. This construction obviously permits a greater range of movement than that shown in Fig. 1 and permits swinging the shelf entirely to the rear of the front face of the refrigerator. Also this preferred shelf construction and mounting permit the use of a shelf of practically regular rectangular shape.

In certain cases it is desirable that only a portion of the shelf space be withdrawn as a unit from the refrigerator. For example, in some establishments, such as hospitals, the practice is to keep certain materials in refrigerators for a relatively long period, while other articles are taken out and replaced much more frequently. The invention provides constructions and arrangements of shelf devices to enable selective use and re-arrangement of the various shelves and containers so as to permit the most convenient operation of the refrigerator and flexible classification of the articles so that their accessibility may be based upon their frequency of use, for example.

In accordance with the foregoing objects, the modification shown in Figs. 17 and 18 discloses a simple arrangement of the shelves on individual carriers at each shelf level. As shown, carrier track members 60, having upper and lower trackways, are provided at a plurality of levels along the refrigerator wall. Relatively small carrier members 61 adapted to support a single shelf arm and shelf may be used for these individual trackways. Thus only a single shelf may be pulled forward into position A and then swung into the other positions as desired, rather than pulling forward the whole battery of shelves.

Additional flexibility of shelf arrangement and disposition is indicated in the form shown in Figs. 19, 20, and 21. As embodied, the carrier 10 on the side wall 1 of the refrigerator is provided with a somewhat narrower battery of shelves 70 which leave a space between the rear of their carrier arms 30 and the rear wall 3 of the cabinet. This rear space is adapted to house a relatively narrow rack 75 which is separate from the shelf 70 and is supported on its own carrier 76 and arm or arms 77, the carrier 76 being travelable along trackways 78 on the opposite side wall 2 of the refrigerator.

The rack 75 may comprise a single relatively high and narrow container extending the full depth of the food chamber, similar to the racks sometimes provided on the inner face of present-day refrigerator doors; or it may itself comprise a plurality of relatively narrow shelves or containers.

The operation of the dual arrangement of shelf, rack and carriers shown in Fig. 19 is indicated in Fig. 20. With this construction it is possible to pull forward only the shelves 70, if desired, and manipulate them in any of the ways hereinbefore described. If desired, the rack 75 may be pulled forward on its carrier when the shelves 70 are out of the way, in either position B or position C. As indicated in dotted lines in Fig. 20, the rack 75 may then be swung and slid out of the cabinet and into a position D approximately paralleling the refrigerator door 5 thus exposing the entire food chamber. With both the shelves 70 and the rack 75 withdrawn from the cabinet it is then possible to effect an optional reversal in the relative positions of the shelves and rack by returning the shelf 70 first and sliding them and their carrier all the way to the rear of the cabinet. The rack 75 may then be returned and will lie in front of the shelves in the position indicated in Fig. 21.

It will be obvious from the foregoing that numerous other arrangements of shelves, racks and carriers may be provided so as to give a very great flexibility in the disposition of these devices. The various modifications and sub-arrangements made possible through using the principles of the invention will be obvious in view of the foregoing disclosures.

A further modification is indicated in Fig. 22, where the rack 75 and shelf battery 70 are mounted on the same carrier and arms which lie intermediate the two. This arrangement has many of the advantages of the form shown in Figs. 19 to 21 and also provides uniform distribution of weight on the single carrier and arms.

Various constructional modifications are shown in Figs. 8 and 13. In Fig. 8 a modified form of carrier is shown in which the carrier plate 10 is provided with hinge lug brackets 90 struck up from the plate 10 itself instead of having the hinge rod 11 hereinbefore described. Also the rollers 19 and 20 are trunnioned in the plate itself as shown.

Fig. 13 shows a single carrier plate 100 in lieu of the several independent carrier arms 30 hereinbefore described. The plate 100 is provided with a plurality of slots 101 for receiving the hooks 37 of the shelves and permitting setting the shelves at different levels. In this construction the entire battery of shelves would travel together both in their to-and-fro movement and their swinging movements. It will be noted that the upper right hand corner of the plate 100 is cut away to provide clearance for a refrigerating unit, ice-box or the like. Similarly (Fig. 1) the upper shelf arm 30 may be made shorter than the lower ones to provide similar clearance. The various illustrated and described modifications are solely exemplary and do not exhaust the modifications possible within the scope of the invention.

From the foregoing it will be clear that the invention provides devices and shelf arrangements which can be installed in standard refrigerator cabinets without any substantial change in the cabinet design. Accordingly, the invention is readily applicable for replacement of the shelves in standard refrigerators in use as well as for refrigerators specially constructed to accommodate the devices of the invention. It is therefore contemplated to install the carrier, arms and shelves as replacement units or sub-units in existing refrigerators in addition to equipping new refrigerators therewith.

The invention in its broader aspects is not limited to the specific mechanisms shown and described but departures may be made therefrom within the scope of the accompanying claims without departing from the principles of the invention and without sacrificing its chief advantages.

What I claim is:

1. A refrigerator including in combination a cabinet having vertical side walls, a vertically disposed carrier movable horizontally along one of said walls, a plurality of shelf-supporting arms carried by said carrier and horizontally swingable with respect thereto, horizontal shelves detachably connected to said arms and swingable with the arms about the forward end of the side wall when said carrier is in its forward position.

2. A refrigerator including in combination a cabinet having vertical side walls, a vertically disposed carrier movable horizontally along one of said walls, a plurality of shelf-supporting arms carried by said carrier and horizontally swingable with respect thereto, horizontal shelves detachably connected to said arms and swingable with the arms about the forward end of the side wall when said carrier is in its forward position, the arms being variably positionable vertically with respect to the carrier.

3. A refrigerator including in combination a cabinet having vertical side walls, a vertically disposed carrier movable horizontally along one of said walls, a plurality of shelf-supporting arms carried by said carrier and horizontally swingable with respect thereto, horizontal shelves detachably connected to said arms and swingable with the arms about the forward end of the side wall when said carrier is in its forward position, the shelves being variably positionable vertically with respect to the arms.

4. A refrigerator including in combination a cabinet having vertical side walls and a front door, a horizontally disposed shelf movable parallel to the wall from the rear to the front of the cabinet, a pivotally mounted member supporting the shelf and swingable to carry the shelf around the forward end of the wall, the shelf being movable away from the pivot to clear the corners of the wall.

5. A refrigerator including in combination a cabinet having vertical side walls and a front door, a carriage horizontally movable parallel to a side wall within the cabinet from a position near the rear wall to a forward position within the front door, a plurality of shelf-supporting arms independently pivotally connected to the carriage for horizontal swinging movement with respect thereto, shelves detachably supported by said arms and swingable through the open door to positions outside the cabinet, and means for moving the shelves away from the pivot to permit clearance in the swinging movement around the end of the side wall.

6. A refrigerator including in combination a cabinet having vertical side walls, a vertically disposed carrier movable horizontally along one of said walls, a plurality of shelf-supporting arms carried by said carrier and horizontally swingable with respect thereto, horizontal rectangular shelves detachably connected to said arms and independently swingable with the arms about the forward end of the side wall when said carrier is in its forward position.

7. A refrigerator including in combination a horizontally movable carrier, a shelf-supporting arm hinged thereto for horizontal swinging movement and a shelf slidably connected to the arm.

8. A refrigerator including in combination a cabinet and a hinged door closing the front thereof, a shelf carrier movable inwardly and outwardly closely adjacent to the side wall of the cabinet opposite the door hinge, an angled shelf support pivotally mounted on said carrier, the adjacent arm of the support being positionable adjacent the carrier and the other arm projecting out therefrom and a rectangular shelf supported on the outwardly projecting arm of said support, the shelf being projected outside and to one side of the door opening when the arm is rotated about its pivot to its outermost position.

9. A refrigerator including in combination a cabinet having a door at the front, a rectangular shelf mounted within the cabinet and slidably movable partially outside the cabinet through the opened door and means for moving the shelf through an arc substantially greater than ninety degrees while maintaining the shelf in its original horizontal plane.

10. A refrigerator including in combination a cabinet having a door at the front, a rectangular shelf mounted within the cabinet and slidably movable through the opened door and means for moving the shelf around the front end of a side wall of the cabinet and to a position along the outer face of said side wall.

11. A refrigerator including in combination a cabinet having a door at the front, a rectangular shelf mounted within the cabinet and slidably movable through the opened door and means for moving the shelf around the front end of a side wall of the cabinet and to a position along the outer face of said side wall so that the shelf lies in a substantially reversed position outside the cabinet but in its original horizontal plane.

12. A refrigerator including in combination a cabinet having a door at the front, a rectangular shelf slidably movable through the opened door, a pivotal mounting for swinging the withdrawn shelf away from the opened door and a slidable mounting for permitting further rectilinear movement of the shelf away from its pivot.

13. A cabinet construction including in combination a cabinet having a hinged door at the front, a shelf slidably movable within the cabinet, means for supporting the shelf outside the cabinet to permit pivotal movement of the shelf about the end of the cabinet wall on which the door is hinged and further supporting means permitting sliding movement of the shelf along the face of the opened door.

14. A cabinet construction including in combination a cabinet having a door at the front, a rectangular shelf mounted within the cabinet and having sliding and pivotal movement in a horizontal plane relative to the cabinet, and means for moving the shelf by a combined sliding and swinging movement through the opened door and around the front end of a side wall of the cabinet through an arc substantially greater than ninety degrees.

JOHN T. WHALEN.